United States Patent [19]

Naarmann et al.

[11] Patent Number: 4,535,039
[45] Date of Patent: Aug. 13, 1985

[54] BATTERY OR ELECTROCHEMICAL STORE BASED ON ELECTROCHEMICALLY OXIDIZABLE AND/OR REDUCIBLE POLYMERS

[75] Inventors: Herbert Naarmann, Wattenheim; Gernot Koehler, Ludwigshafen, both of Fed. Rep. of Germany

[73] Assignee: BASF Aktiengesellschaft, Fed. Rep. of Germany

[21] Appl. No.: 555,983

[22] Filed: Nov. 29, 1983

[30] Foreign Application Priority Data

Dec. 4, 1982 [DE] Fed. Rep. of Germany ....... 3244900

[51] Int. Cl.$^3$ .............................................. H01M 6/18
[52] U.S. Cl. .................................... 429/213; 429/191; 429/194
[58] Field of Search ................ 429/213, 212, 191, 194

[56] References Cited

U.S. PATENT DOCUMENTS

| | | | |
|---|---|---|---|
| 2,831,045 | 4/1958 | Harding | 429/213 |
| 3,185,590 | 5/1965 | Mayer et al. | 429/213 X |
| 3,660,163 | 5/1972 | Moser | 429/213 X |
| 4,181,779 | 1/1980 | Teo | 429/213 X |
| 4,321,114 | 3/1982 | MacDiarmid et al. | 429/50 X |

FOREIGN PATENT DOCUMENTS

| | | | |
|---|---|---|---|
| 36118 | 9/1981 | European Pat. Off. | |
| 0050441 | 4/1982 | European Pat. Off. | 429/213 |
| 0052868 | 5/1981 | Japan | 429/213 |
| 0154774 | 9/1982 | Japan | 429/213 |
| 0206065 | 12/1983 | Japan | 429/213 |
| 1216549 | 12/1970 | United Kingdom | 429/213 |

OTHER PUBLICATIONS

Robert Cooke, Electric Car Potential p. 25, The Battery Man, Jul., 1981.

*Primary Examiner*—Anthony Skapars
*Attorney, Agent, or Firm*—Keil & Weinkauf

[57] ABSTRACT

In batteries or electrochemical stores, in particular secondary cells, the active material of the cathode and/or the anode consists of one or more electrically conductive polymers which have an electrical conductivity greater than $10^{-2}$ Ohm$^{-1}$ cm$^{-1}$ and contain electrochemically oxidizable and/or reducible redox groups which have a defined structure and are capable of forming two or more stable oxidation states which preferably are reversibly interconvertible.

19 Claims, No Drawings

BATTERY OR ELECTROCHEMICAL STORE BASED ON ELECTROCHEMICALLY OXIDIZABLE AND/OR REDUCIBLE POLYMERS

The present invention relates to batteries or electrochemical stores, in particular secondary cells, where the active material of the cathode and/or anode consists of one or more electrically conductive and electrochemically oxidizable and/or reducible polymers. The novel batteries and electrochemical stores have a high energy density and power density and excellent stability coupled with low weight.

U.S. Pat. No. 2,831,045 and German Published Application DAS No. 1,035,227 describe primary and secondary cells which contain electron-exchange resins (redox polymers) as the electrode material. Redox polymers found to be useful in this context are vinylhydroquionone polymers and hydroquinone-containing polycondensates, for example those obtained from phenol, formaldehyde and hydroquinone. Since these redox polymers themselves are not electrically conductive, when they are used as electrode material they have to be employed together with an electrically conductive substance, eg. graphite or metal duct. Such battery systems cannot be satisfactorily reproduced (cf. H. G. Cassidy and K. A. Kun, Oxidation-reduction polymers (redox polymers), Polymer Rev., vol. 11 (1965), Interscience Publishers, pages 255 and 256).

U.S. Pat. No. 3,660,163 discloses primary batteries containing a lithium anode, an organic iodine charge-transfer complex as the cathode, and lithium iodide as the electrolyte. The cathode material employed according to the stated patent, eg. poly(vinylpyridinium) iodide, is likewise electrically non-conductive, and this greatly reduces the capacity of these batteries. Moreover, these batteries are not rechargeable.

Light-weight batteries which have a high energy density and power density and contain, as the active material of the cathode and/or anode, electrically highly conductive p- or n-doped conjugated polymers have also been disclosed (cf. European Laid-Open Applications Nos. 36,118, 49,970 and 50,441). The conjugated polymers, among which the polyacetylenes should be particularly singled out, can be subjected to reversible electrochemical doping and dedoping, and possess various degrees of oxidation depending on the degree of doping. However, it has been found that barriers of this type still do not completely satisfy all the requirements made with respect to batteries.

It is an object of the present invention to provide novel light-weight batteries or electrochemical stores which are based on electrochemically oxidizable and/or reducible polymers, have a high energy density and power density, possess the disadvantages of the conventional batteries of this type only to a small extent, if at all, are easy to produce and to handle, employ the conventional electrolyte systems and, in particular, have good reproducibility, high stability and a long cycle life. The novel batteries should have a high capacity coupled with a very low tendency to self-discharge.

We have found that this object is achieved, in accordance with the invention, by a battery in which the active material of the cathode and/or anode consists of one or more electrically conductive polymers which have an electrical conductivity greater than $10^{-2}$ Ohm$^{-1}$ cm$^{-1}$ and contain electrochemically oxidizable and/or reducible redox groups which have a defined structure and are capable of forming two or more stable oxidation states which preferably are reversibly interconvertible.

The present invention accordingly relates to batteries or electrochemical stores comprising one or more cathode, one or more anodes and one or more media for current transport within the batteries or electrochemical stores, wherein the active material of the cathode and/or anode consists of one or more electrically conductive polymers which have an electrical conductivity greater than $10^{-2}$ Ohm$^{-1}$ cm$^{-1}$ and contain electrochemically oxidizable and/or reducible redox groups which have a defined structure and are capable of forming two or more stable oxidation states which preferably are reversibly interconvertible.

The present invention furthermore relates to specific embodiments of these batteries or electrochemical stores, as described in detail below.

We have found that, in the novel batteries, the discharging and/or charging processes take place at the defined redox groups of the electrically conductive polymers used as the active electrode material. Surprisingly, these polymers are not damaged by oxidation or reduction during discharging and/or charging of the batteries, and the electrode material exhibits a constant high activity even after a very large number of discharging and charging cycles. The batteries have a high energy density and power density, have a very high capacity, have only a very low tendency to self-discharge and give high current efficiencies even after a large number of discharging and charging cycles. The batteries have very good reproducibility as well as very high stability. The electrically conductive polymers with the incorporated, defined redox groups are in general comparatively stable to air and insensitive to moisture, and are therefore easy to handle and are used under the conditions conventionally employed for commercial batteries. The novel batteries can be primary cells or, in particular, secondary cells, which may take any suitable form.

In accordance with the invention, the active material of the cathode and/or anode in the batteries or electrochemical stores consists of one or more electrically conductive polymers containing redox groups having a defined structure. For the sake of simplicity, these polymers are referred to below as redox polymers. In accordance with the invention, it is possible to use any redox polymer which has an electrical conductivity greater than $10^{-2}$, preferably greater than or equal to 1, Ohm$^{-1}$ cm$^{-1}$ and whose redox groups are capable, under the operating conditions of the battery, of forming two or more stable oxidation states which in particular are reversibly interconvertible. These redox polymers can be either electrically conductive polymers which contain organic redox groups, as side groups, bonded to the polymer main chain, or polymers which contain redox groups in the polymer main chain itself, or polymeric, branched and/or crosslinked systems containing redox groups having a defined structure. Since the redox groups are important for the charging and discharging of the novel batteries, and the energy density and power density of these batteries are therefore directly related to the number of redox groups incorporated in the polymers, it is advantageous, in accordance with the invention, to use those electrically conductive polymers which contain a very large number of the defined redox groups.

One group of very useful redox polymers employed according to the invention comprises, for example, to use the electrically conductive polymers which possess redox side groups and an unsaturated polymer main chain containing conjugated double bonds along the main chain. These conjugated polymers possessing redox side groups are based on, for example, polyphenylenes or heteropolyphenylenes, but in particular or acetylene polymers, and preferably contain, in the polymer main chain, polyene units having not less than 7, and in particular not less than 15, conjugated C—C double bonds. To achieve the required electrical conductivity, these conjugated polymers can be p- or n-doped in a conventional manner with the usual dopants (cf. for example U.S. Pat. Nos. 4,204,216 and 4,222,903 and European Laid-Open Application No. A1 16,305). Suitable p-dopants are the conventional electron acceptors, eg. $AsF_5$, $SbF_5$, $SbCl_5$, $PF_5+NOF$, $PCl_5+Cl_2$, $AlCl_3+Cl_2$, HF, $HNO_3$, $H_2SO_4$ and the like; examples of n-dopants are electron donors, eg. Li, Na or K. Doping of the conjugated polymers possessing redox side groups can also be carried out by electrochemical oxidation or reduction with simultaneous incorporation of dopant ions, eg. $PF_6^-$, $AsF_6^-$, $SbF_6^-$, $BF_4^-$, $SbCl_4^-$ or sulfonate anions or $Li^+$, $Na^+$, $K^+$, tertiary or quaternary ammonium ions or tertiary or quaternary phosphonium ions (cf. for example European Laid-Open Application No. A2 36,118). These redox polymers possessing redox side groups can be prepared, for example, by polymerization of acetylene monomers containing redox groups, or by reacting a conjugated polymer with a redox compound, for example by means of a Wittig reaction or by reactions similar to those of redox compounds with vinyl polymers.

Redox polymers from this group which have proven particularly useful are those whose redox side groups are capable of forming quinoid structures. Very advantageous quinoid redox side groups, in addition to, for example, the benzoquinones, benzohydroquinones, naphthoquinones, naphthohydroquinones, anthraquinones, anthrahydroquinones and their derivatives, are the unsubstituted or substituted phenalene radical, the indigo radical or indigo analogs. Particularly advantageous redox groups in this case are the 1,9-disubstituted phenalenes,.

Typical members of the group comprising electrically conductive redox polymers possessing redox side groups are the conjugated polymers which contain the structural elements of the general formula (I)

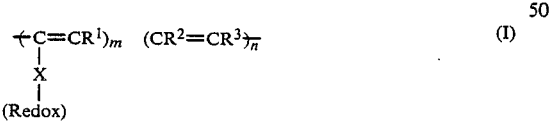

and, as stated above, are p- or n-doped with the conventional dopants in order to achieve an electrical conductivity greater than $10^{-2}$ $Ohm^{-1}$ $cm^{-1}$.

In the general formula (I), $R^1$ is H, $C_1$-$C_5$-alkyl, $C_6$-$C_{12}$-cycloalkyl or $C_6$-$C_{12}$-aryl, in particular H, $R^2$ and $R^3$ are identical or different and are each H, $C_1$-$C_5$-alkyl, $C_2$-$C_4$-alkenyl, $C_6$-$C_{12}$-cycloalkyl or $C_4$-$C_{12}$-aryl, or $R^3$ and $R^4$ can be bonded cyclically to one another, for example via an alkylene radical, in particular $R^2$ and $R^3$ are each H, or one of these radicals is H and the other is $C_1$-$C_5$-alkyl or $C_2$-$C_4$-alkenyl, X is a direct chemical bond, $C_1$-$C_5$-alkylene, $C_2$-$C_5$-alkylidene, $C_1$-$C_5$-alkylidyne, $C_2$-$C_5$-alkenylene, $C_6$-$C_{12}$-cycloalkylene or $C_6$-$C_{12}$-arylene, in particular a direct chemical bond, —$CH_2$— —CH= or —CH=CH—, (Redox) is an organic radical which forms, in particular, quinoid structures and which can occur as two or more stable oxidation states which preferably are reversibly interconvertible, in particular an N, O, S, P and/or $\pi$ system, and, where X is $C_1$-$C_5$-alkylidyne (in particular —CH=) or $C_2$-$C_5$-alkenylene (in particular —CH=CH—), the radical X may also be included in the redox system, m is a number from 1 to 500 and n is a number from 0 to 500, with the proviso that the sum of m and n is from 7 to 1,000.

Examples of redox radicals in the structural elements of the general formula (I) are the unsubstituted or substituted benzoquinone radical, the unsubstituted or substituted naphthoquinone radical, the unsubstituted or substituted anthraquinone radical, the phenalene radical, in particular radicals baedd on 1,9-disubstituted phenalenes, as well as heterocyclic redox groups, for example phenothiazine derivatives and the indigo radical. There is a large variety of possible redox groups, and reference may therefore be made to, for example, K. Deuchert and S. Hünig, Angew. Chem. 90 (1978), 927–938.

The polymers possessing the structural elements of the formula (I) are obtained by a process in which an alkyne containing redox groups, with or without other alkynes, in particular acetylene, is polymerized using a conventional transition metal catalyst, eg. a Ziegler-Natta catalyst. Such a process, for the preparation of phenalene-substituted polyenes, is described in prior German Patent Application P No. 32 32 483.9 (German Laid-Open Application DOS No. 32 32483), and leads to, for example, the advantageous redox polymers possessing structural elements of the general formulae (II) and (III)

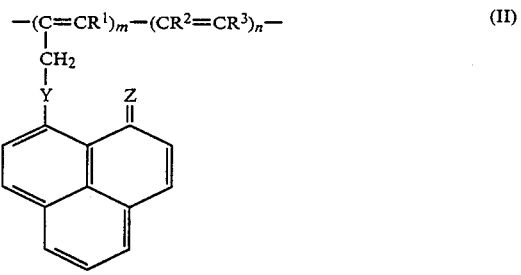

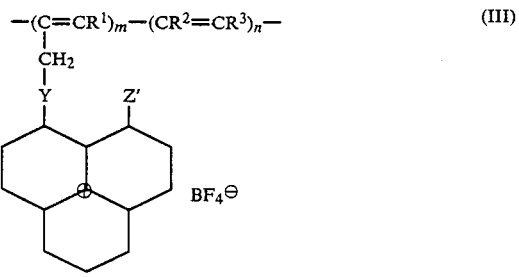

where $R^1$, $R^2$, $R^3$, m and n have the meanings stated above for the general formula (I), Y is a direct chemical bond, —NR—, —O—, —S—, —O—$(CH_2)_p$—O—, —O—$(CH_2)_p$—NR—, —NR—$(CH_2)_p$—NR—, —S—$(CH_2)_p$—O—, —S—$(CH_2)_p$—NR— or —S—$(CH_2)_p$—S— [wherein R is H, $C_1$-$C_5$-alkyl, $C_6$-$C_{12}$-cycloalkyl or $C_7$-$C_{14}$-aralkyl and p is a number from 1 to 5], in particular —NR—, —O— or —S—, Z is O, NR, S, Se or Te [wherein R is H, $C_1$–$C_5$-alkyl, $C_6$–$C_{12}$-cycloalkyl or $C_7$–$C_{14}$-aralkyl], in particular O, NR or S, and Z' is —OR, —SR or —NR$_2$ [where R is H, $C_1$–$C_5$-allkyl, $C_6$–$C_{12}$-cycloalkyl or $C_7$–$C_{14}$-aralkyl, nd in the group —NR$_2$ the two radicals R may furthermore be bonded cyclically to one another; in particular R is H, $C_1$–$C_5$-alkyl or benzyl]. A typical member of this class of polymers is poly[3-(phenalen-1'-on-9'-yl)-aminoprop-1-yne]. Polyenes possessing other redox groups stated above can also be obtained if other alkynes containing redox groups are prepared and polymerized by a methodd similar to that described in German Laid-Open Application DOS No. 3,232,483.

Polymers possessing structural elements of the general formula (I) can also be obtained, using a very large variety of starting materials, if a polyene having reactive substituents or side groups is reacted in a suitable manner with an appropriate redox compound. A very useful reaction for this purpose has been found to be, for example, the reaction of halogen-containing polyenes, in particular polyacetylenes, with triphenylphosphine to give the phosphonium ylides of the polyenes, followed by reaction of these polyene phosphonium ylides, by a Wittig reaction, with aldehyde groups or keto groups of redox compounds. Starting from poly(-propargyl chloride), this reaction gives, for example, redox polymers having repeating units of the general formula (IV)

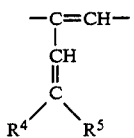

(IV)

If the phosphonium ylides of the polyenes are reacted with aldehydes, in the general formula (IV) $R^4$ is hydrogen and $R^5$ is a redox group of the type described above. If the phosphonium ylidess of the polyenes are reacted with ketones, in the general formula (IV) either $R^4$ iss a hydrocarbon radical, in particular lower alkyl (eg. methyl) and $R^5$ is a redox group of the type described above (for example an aromatic quinone radical), or $R^4$ and $R^5$ together form a cyclic, in particular polycyclic and/or heterocyclic, redox system of the type described above (eg. a phenalene radical).

Examples of typical members of this group of redox polymers are those having repeating units of the following formulae (Iva), (Ivb) and (Ivc)

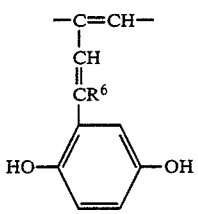

(IVa)

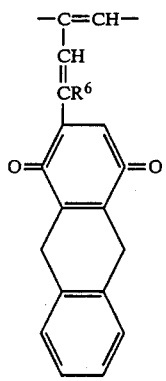

(IVb)

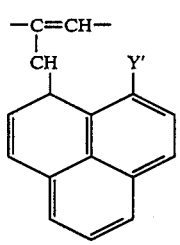

(IVc)

where, in formulae (Iva) and (Ivb), $R^6$ is H or $CH_3$, and, in formula (Ivc), Y' is halogen, —OR, —NR$_2$ or —SR [where R is H, $C_1$–$C_5$-alkyl, $C_6$–$C_{12}$-cycloalkyl or $C_7$–$C_{14}$-aralkyl, and in the group NR$_2$ the two radicals R can be identical or different], in particular Cl, —OR, —NR$_2$ or —SR [where R is H, $CH_3$ or $C_2H_5$].

In addition to the electrically conductive redox polymers possessing redox side groups, according to the invention the electrically conductive polymers which contain the redox groups or redox systems in the main chain are also particularly suitable. Such electrically conductive redox polymers, which are preferably polyconjugated and contain delocalized $\pi$ electrons over the entire macromolecule are known per se and are described in the literature.

This class of redox polymers includes, for example, the polyaminoquinones, as obtained by polycondensation of an aromatic diamine, in particular p-phenylenediamine, with a quinone, eg. benzoquinone. Other redox polymers which are very suitable for use according to the invention are the poly(quinonimines) and poly(quinonediimines), as obtained, for example, by oxidative coupling of aromatic mono-, di- and/or polyamines. A preferred member of this class of redox polymers is aniline black.

Preferred polymers which contain the redox groups in the polymer chain also include poly(heteroaromatics), as represented by, for example, the general formulae (V) and (VI)

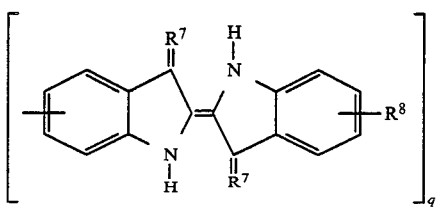
(V)

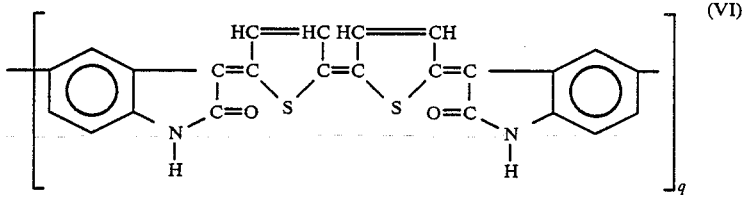
(VI)

where $R^7$ is O, S, Se, So or $SO_2$, in particular O or S, $R^8$ is —O—, —S—, —NH—, —$CH_2$—, —C(O)— or —$C_6H_4$—, and q is greater than or equal to 2, in particular from 5 to 500.

Polymers of the general formula (V) and their preparation are described in European Laid-Open Application No. A1 45,366; regarding the preparation of the polymers of the general formula (VI), reference may be made to J. Pol. Sci., Polymer Letters, 4 (1966), 1,023-1,028.

The polymers of the general formulae (V) and (VI) are members of a very useful class of redox polymers which contain repeating units of the general formula (VII)

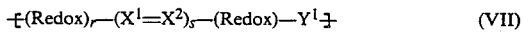  (VII)

where $X^1$ and $X^2$ are each CH, N or a ring atom of a cyclic or polycyclic π system formed togetherr with the (redox) group or groups, and $X^1$ and $X^2$ can be identical or different, with the proviso that $X^1$ and $X^2$ are different if $X^1$ or $X^2$ is N; $Y^1$ is a direct chemical bond, $C_1$-$C_5$-alkylene, $C_2$-$C_5$-alkylidene, $C_1$-$C_5$-alkylidyne, $C_2$-$C_5$-alkenylene, $C_6$-$C_{12}$-cycloalkylene, $C_6$-$C_{12}$-arylene, alkylenearylene, —C(O)—, —O—, —S— or —NH—, in particular a direct chemical bond, —$CH_2$—, —CH=, —CH=CH—, phenylene, —O—, —S— or —NH—; (redox) is an organic radical which forms, in particular, quinoid structures and which can occur in two or more stable oxidation states which preferably are reversibly interconvertible, in particular an N, O, S, P or π system, and $X^1$ and/or $X^2$ may be included in cyclic or polycyclic redox systems, and in particular π systems; r is 0 or 1; and s is a number from 1 to 100, preferably from 1 to 10.

In addition to the groups represented by the general formulae (V) and (VI), examples of redox groups in the general formula (VII) are aromatic systems, alkylaromatic systems, alkylamines, heteroaromatic systems and ring systems in which the group —($X^1$=$X^2$)$_s$— can be partially or completely incorporated in a ring system. With regard to the large variety of possible forms of redox groups, and hence of polymers of the general formula (VII), reference may be made to the publication by K. Deuchert and S. Hünig in "Angewandte Chemie" cited above, where, with reference to the similar low molecular weight redox compounds, a large number of structures and systems for redox groups is described. The redox polymers of the general formula (VII) can be synthesized similarly to the redox systems described by K. Deuchert and S. Hünig, or can be obtained from the systems, for example by oxidative coupling or chemical reaction.

The polyconjugated polymers which contain the redox groups in the polymer main chain are, as such, frequently electrically conductive, examples of such polymers being aniline black and the polymers of the general formula (VII); this is in general very advantageous when they are used, in accordance with the invention, as active electrode material in the batteries. If required, ie. if these redox polymers have an electrical conductivity below $10^{-2}$ $Ohm^{-1}$ $cm^{-1}$ or if it is intended to increase their conductivity still further, the polymers containing the redox groups in the main chain can also be p- or n-doped with the conventional dopants, as described, for example, in European Laid-Open Application No. A1 345,366 for the polyheteroaromatics of the general formula (V). Suitable dopants are the electron acceptors or electron donors stated above, including the ionic dopants.

In accordance with the invention, the electrically conductive redox polymers can be used in any suitable form as active electrode material for the batteries or electrochemical stores. For example, it is possible to use the redox polymers in the form of self-supporting films or sheets or of foamed open-cell moldings or foams. This is particularly advisable where the redox polymers are capable of forming stable, solid, self-supporting films or sheets.

Similarly, when used as electrode material in the batteries or electrochemical stores, the redox polymers can be applied onto a substrate by, for example, laminating films or sheets of the redox polymers with the substrate, or powder-coating the substrate with the redox polymers. Suitable substrates are inert bases, for example films or sheets of conventional polymers which are stable under the operating conditions of the battery, in particular woven fabrics, nonwovens, etc. of organic or inorganic, electrically non-conductive materials, eg. glasswool mats or the like, which at the same time can serve as separators or diaphragms. However, it is also possible to use electrically conductive substrates, for example metal sheets or foils, eg. platinum, palladium, gold, silver, tantalum or stainless steel, or films or sheets of the conventional electrically conductive conjugated polymers, eg. doped polyacetylene or, in particular, polypyrrole. If the redox polymers are applied onto an electrically conductive substrate, this can, for example, simultaneously serve for conducting current to the electrode or away from it.

Furthermore, the electrically conductive redox polymers can be used for the production of electrodes in the form of sintered or compressed powders, for example as sintered or pressed plates. Pressed or sintered electrodes can be produced using the conventional additives, eg. binders, pigments, carbon black, inert metals or base or matrix materials, such as other polymeric substances. These additives are present in the novel electrode materials in general in amounts of less than 50% by weight, based on the total electrode material; in accordance with the invention, the electrodes are preferably produced without the use of these additives. It is also possible to employ the redox polymers in gridded electrodes or cage electrodes.

According to the invention, the electrically conductive redox polymers in the batteries or electrochemical stores can constitute the active material of the cathode and/or the anode.

If the active material of the cathode consists of a redox polymer of the type under discussion, any suitable conventional anode material which has a higher oxidation potential than the cathode can be used as the anode. In this case, the anode preferably consists of an electropositive metal having a Pauling electronegativity of not more than 1, in particular cesium, rubidium, potassium, sodium, barium, calcium or an alloy of these metals, but preferably lithium or a lithium alloy. However, the anode material used can also be an n-doped conjugated polymer, eg. polyacetylene doped with lithium, sodium, tertiary or quaternary ammonium or tertiary or quaternary phosphonium ions.

If the active material of the anode consists of an electrically conductive redox polymer of the type under discussion, the cathode can consist of any suitable conventional cathode material. Particularly suitable for this purpose are metals whose oxidation potential is below that of the redox polymer used as the active anode material. Examples of metals which are preferably used as cathode material in this case are platinum, palladium, gold, silver, nickel, titanium and the like. However, the cathode used may also be, for example, a carbon electrode or a p-doped conjugated polymer, eg. polypyrrole or polyacetylene doped with $AsF_5$, $SbF_5$, $SbCl_5$, $PF_6^-$, $BF_4^-$ or $ClO_4^-$. It is particularly advisable to use an n- or p-doped conjugated polymer as a counter-electrode where the novel batteries are primary cells. In the case of secondary cells, preferred counter-electrodes are the stated metal or carbon electrodes.

In the novel batteries or electrochemical stores, the active material of the cathode and of the anode may also consist of the electrically conductive redox polymers, the oxidation state of the cathodic redox polymer being higher than that of the anodic one. In this case, it has proven particularly advantageous for the active anode material and the active cathode material to consist of different redox polymers.

The novel batteries or electrochemical stores furthermore contain a medium, in particular an electrolyte, which is capable of transporting current within the battery or the electrochemical store when the battery is operated. In the case of secondary cells, the electrolyte must furthermore be such that reversible interconversion of the redox polymers is ensured, without electrode material or electrolyte being removed irreversibly from the battery system as a result. Usually, particularly in secondary cells, the electroklyte is a solution of a conductive salt in an electrolyte solvent. In the case of primary cells, however, solid electrolytes can also be used. The particular electrolyte system employed also depends substantially on the electrode materials used, and should be adapted to these and to the function of the battery or of the electrochemical store.

With the stated preconditions, the electrolyte system used can be a conventional one. Particularly suitable conductive salts for the electrolyte system are perchlorates, tetrafluoborates, hexafluoroarsenates, hexafluoroantimonates and hexafluorophosphates. Other suitable salts are salts of sulfonic acids, for example of aromatic sulfonic acids which are unsubstituted or substituted by alkyl and/or nitro, in particular benzene sulfonates or tosylates, or fluorosulfonates, eg. trifluoromethane sulfonate. Particularly suitable cations for the conductive salts are the alkali metal cations, preferably $Li^+$, $Na^+$ or $K^+$, other very useful cations being the tertiary or quaternary ammonium and phosphonium cations, for example the tetramethylammonium, tetraethylammonium, tri-n-butylammonium, triphenylphosphonium, tri-n-butylphosphonium or tetra-n-butylphosphonium cation. If the anode in the novel batteries or electrochemical stores consists of a metal having a high oxidation potential, in particular an alkali metal, the conductive salt is preferably a salt of the metal which forms the anode, this being the case particularly for secondary cells. Examples of suitable and preferred conductive salts are lithium perchlorate, sodium perchlorate, tetrabutylammonium perchlorate, lithium tetrafluoborate, sodium tetrafluorborate, lithium hexafluoroarsenate, lithium hexafluoroantimonate, lithium hexafluorophosphate, tetraethylammonium hexafluorophosphate, tetramethylammonium hexafluorophosphate, triphenylphosphonium tetrafluoroborate and tributylammonium benzene sulfonate.

The conductive salts can be used either as a solid electrolyte in primary cells or can be employed in electrolyte solutions. In the latter case, the conductive salt should have a very high solubility in the electrolyte solvent. Advantageously, the concentration of the conductive salt in the electrolyte solution is from about 0.01 to about 2.0 moles per liter of electrolyte solvent.

The electrolyte solvent should be essentially inert to the cathode and anode, and should not undergo electrochemical decomposition. Examples of suitable electrolyte solvents are ethers (eg. ethylene glycol dimethyl ether or diethylene glycol dimethyl ether), cyclic ethers (eg. tetrahydrofuran, 2-methyl-, 3-methyl-, 2,5-dimethyl- or 2,5-dimethoxytetrahydrofuran, 1,3-dioxolane or dioxane), organic carbonates (eg. propylene carbonate), esters (eg. methyl acetate), lactones or lactams (eg. $\gamma$-butyrolactone, $\alpha$-methyl-$\gamma$-butyrolactone or 1-methyl-2-pyrrolidone), nitriles and amides (eg. acetonitrile or dimethylformamide) and organic sulfones, sulfoxides and sulfites (eg. sulfolan, 3-methylsulfolan, ethylene sulfite, dimethyl sulfite or dimethyl sulfoxide). A particular advantage of the novel batteries or electrochemical stores is that it is also possible to use aqueous electrolyte systems. For example, it is possible to employ water or mixtures of water with organic solvents, eg. alcohols, acetonitrile or the like, as the electrolyte solvent. Electrolyte systems which contain aqueous hydrofluoric acid are also advantageous. The choice of the electrolyte system which is suitable in a particular case depends, as stated above, mainly on the electrode material used.

The novel batteries or electrochemical stores can be produced in an extremely large variety of forms. Because of the electrode materials used according to the invention, it is possible to produce, in particular, very light-weight, thin, flexible batteries of any desired size. In the novel batteries or electrochemical stores, the anode and the cathode can also be separated from each other by diaphragms or separators, eg. filter paper, glass frits, porous ceramic materials or porous or semipermeable polymeric materials. In secondary cells, the batteries can be assembled in the charged or uncharged state.

The batteries according to the invention have a low weight and a high energy density and power density coupled with high stability, a long cycle life and a low tendency to self-discharge. The properties of the novel secondary cells remain essentially constant even after a very large number of recharging cycles.

The examples which follow illustrate the invention.

EXAMPLES 1 TO 8

Using the various active anode materials, active cathode materials and electrolytes shown in the Table, various cells were constructed in which the cathode and the anode were immersed in an about 0.5 molar solution of the conductive salt in a cell container consisting of polymethyl methacrylate. The batteries were discharged continuously via a loading resistor, initial potentials (operating potentials) of from 0.5 to 4.9 V and currents of from 10 to 100 mA being measured.

The same results were achieved even after repeated recharging of the exhausted cells.

4. A battery or electrochemical store as claimed in claim 3, wherein the redox groups are 1,9-disubstituted phenalenes.

5. A battery or electrochemical store as claimed in claim 1, wherein the electrically conductive redox polymer contains the redox groups in the polymer main chain.

6. A battery or electrochemical store as claimed in claim 5, wherein the electrically conductive redox polymer is a polymer which contains repeating units of the formula (VII)

$$-\!\!\{(Redox)_r\!-\!(X^1\!\!=\!\!X^2)_s\!-\!(Redox)\!-\!Y^1\}\!-\quad (VII)$$

where $X^1$ and $X^2$ are each CH, N or a ring atom of a cyclic or polycyclic $\pi$ system formed together with the (Redox) group or groups, and $X^1$ and $X^2$ can be identical or different, with the proviso that $X^1$ and $X^2$ are different if $X^1$ or $X^2$ is N; $Y^1$ is a direct chemical bond, $C_1$–$C_5$-alkylene, $C_2$–$C_5$-alkylidene, $C_1$–$C_5$-alkylidyne, $C_2$–$C_5$-alkenylene, $C_6$–$C_{12}$-cycloalkylene, $C_6$–$C_{12}$-arylene, alkylenearylene, —C(O)—, —O—, —S— or —NH—; (Redox) is an organic radical which can occur in two or more stable oxidation states, and $X^1$ and/or $X^2$ can be included in cyclic (Redox) groups; r is zero or 1; and s is a number from 1 to 100, preferably from 1 to 10.

7. A battery or electrochemical store as claimed in claim 5, wherein the redox polymer is p-doped with an electron acceptor or n-doped with an electron donor.

8. A battery or electrochemical store as claimed in

TABLE

| Example No. | Anode | Cathode | Conductive salt |
|---|---|---|---|
| 1 | lithium | aniline black | $Li^+PF_6^-$ |
| 2 | lithium | (V) where $R^7$ is O, $R^8$ is p-$C_6H_4$— and q ~ 50 | $Li^+ClO_4^-$ |
| 3 | lithium | Polyindophenine (VI) where q ~ 20 | $Li^+ClO_4^-$ |
| 4 | lithium | (IVc) where Y' is —OCH$_3$ $p_n > 15$ | $(ethyl)_3NH^+AsF_6^-$ |
| 5 | lithium | (II) where Y is NH, Z is O, $R^1$ is H, m > 10 and n is zero | $Li^+BF_4^-$ |
| 6 | sodium (pressed onto Al) | as in Example 5 | $Na^+BF_4^-$ |
| 7 | n-doped polyacetylene | as in Example 5 | $(n-butyl)_4N^+SbF_6^-$ |
| 8 | (IVa) where $R^6$ is $CH_3$; $P_n \sim 50$ | polyacetylene p-doped with $AsF_5$ | $Li^+AsF_6^-$ |

We claim:

1. A battery or electrochemical store comprising one or more cathodes, one or more anodes and one or more media for current transport within the battery or electrochemical store, wherein the active material of the cathode and/or anode consists of one or more electrically conductive polymers which have an electrical conductivity greater than $10^{-2}$ Ohm$^{-1}$ cm$^{-1}$ and contain electrochemically oxidizable and/or reducible redox groups which have a defined structure and are capable of forming two or more stable oxidation states.

2. A battery or electrochemical store as claimed in claim 1, wherein the electrically conductive redox polymer is a p- or n-doped polyene which contains the redox groups as side groups bonded to the polymer main chain.

3. A battery or electrochemical store as claimed in claim 2, wherein the redox groups are groups which are capable of forming quinoid structures.

claim 5, wherein the redox polymer is a poly(quinonimine) or a poly(quinonediimine).

9. A battery or electrochemical store as claimed in claim 5, wherein the redox polymer is polyindigo, an analog of polyindigo, or a polyindophenine.

10. A battery or electrochemical store as claimed in claim 1, wherein the electrically conductive redox polymer is used in the form of a self-supporting film or sheet.

11. A battery or electrochemical store as claimed in claim 1, wherein the electrically conductive redox polymer is applied onto an electrically conductive substrate.

12. A battery or electrochemical store as claimed in claim 1, wherein the electrically conductive redox polymer is applied onto an electrically non-conductive organic or inorganic substrate.

13. A battery or electrochemical store as claimed in claim 1, wherein the redox polymer is used in compressed or sintered form.

14. A battery or electrochemical store as claimed in claim 1, wherein the active material of the cathode consists of the redox polymer or polymers, and the anode consists of a metal having a Pauling electronegativity not greater than 1.0.

15. A battery or electrochemical store as claimed in claim 1, wherein the active material of the anode consists of the redox polymer or polymers, and the cathode consists of a metal having a half-wave potential greater than that of the redox polymer or polymers.

16. A battery or electrochemical store as claimed in claim 1, wherein the active materials of the anode and cathode consist of different redox polymers.

17. A battery or electrochemical store as claimed in claim 1, wherein the medium for transporting current within the battery or the electrochemical store is a solid electrolyte or an electrolyte solution.

18. A battery or electrochemical store as claimed in claim 17, wherein the electrolyte constitutes or contains a salt comprising a cation from the group consisting of $Li^+$, $Na^+$, $K^+$, $R_4N^+$ or $R_4P^+$ (where R is hydrogen and/or a lower alkyl radical, a cycloaliphatic radical or an aromatic radical) and an anion from the group consisting of $BF_4^-$, $AsF_6^-$, $SbF_6^-$, $SbCl_6^-$, $PF_6^-$, $ClO_4^-$ and sulfonate anions.

19. A battery or electrochemical store as claimed in claim 17, which contains an aqueous electrolyte system.

* * * * *